US012018580B1

(12) United States Patent
Humes

(10) Patent No.: US 12,018,580 B1
(45) Date of Patent: Jun. 25, 2024

(54) ROTOR ASSEMBLY FOR GAS TURBINE ENGINES WITH REPLACEABLE BALANCE WEIGHT PINS

(71) Applicant: Rolls-Royce North American Technologies Inc., Indianapolis, IN (US)

(72) Inventor: Ryan C. Humes, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 0 days.

(21) Appl. No.: 18/231,565

(22) Filed: Aug. 8, 2023

(51) Int. Cl.
*F01D 5/02* (2006.01)
*F01D 5/30* (2006.01)

(52) U.S. Cl.
CPC ........... *F01D 5/027* (2013.01); *F01D 5/3038* (2013.01); *F05D 2230/60* (2013.01); *F05D 2240/59* (2013.01)

(58) Field of Classification Search
CPC ............ F01D 5/027; F16F 15/32; G01M 1/32
See application file for complete search history.

(56) References Cited

U.S. PATENT DOCUMENTS

| | | | | |
|---|---|---|---|---|
| 2,385,252 | A * | 9/1945 | Bennett, Jr. | F16F 15/32 368/170 |
| 4,220,055 | A | 9/1980 | Dubois et al. | |
| 4,926,710 | A | 5/1990 | Novotny | |
| 5,847,640 | A * | 12/1998 | Fukaya | H01C 10/306 338/322 |
| 7,347,672 | B2 | 3/2008 | Bertrand et al. | |
| 8,186,954 | B2 | 5/2012 | Lee et al. | |
| 8,668,457 | B2 | 3/2014 | Juh | |
| 8,888,458 | B2 | 11/2014 | Billings et al. | |
| 9,297,258 | B2 | 3/2016 | Woods et al. | |
| 9,909,424 | B2 | 3/2018 | Douady et al. | |
| 10,544,678 | B2 | 1/2020 | Espinoza | |
| 10,557,356 | B2 | 2/2020 | Wines et al. | |
| 10,598,017 | B2 * | 3/2020 | Gerez | F01D 5/027 |
| 10,697,300 | B2 | 6/2020 | Rosborough | |
| 10,738,639 | B2 | 8/2020 | Porter et al. | |
| 11,053,798 | B2 | 7/2021 | Juh | |
| 11,168,565 | B2 | 11/2021 | Winder et al. | |
| 11,448,081 | B2 | 9/2022 | Dyer et al. | |
| 2005/0265846 | A1 * | 12/2005 | Przytulski | F01D 5/027 416/144 |
| 2009/0087313 | A1 * | 4/2009 | Belmonte | F01D 5/027 416/144 |
| 2011/0044816 | A1 | 2/2011 | Lecuyer et al. | |
| 2011/0078901 | A1 | 4/2011 | Glasspoole et al. | |
| 2014/0140849 | A1 | 5/2014 | Muscat et al. | |
| 2017/0074104 | A1 | 3/2017 | Stone | |
| 2020/0040764 | A1 * | 2/2020 | Hugon | F01D 5/025 |
| 2021/0087934 | A1 * | 3/2021 | Veitch | F04D 29/662 |
| 2022/0235662 | A1 | 7/2022 | Hagan et al. | |

* cited by examiner

*Primary Examiner* — Woody A Lee, Jr.
*Assistant Examiner* — Cameron A Corday
(74) *Attorney, Agent, or Firm* — Barnes & Thornburg LLP

(57) ABSTRACT

A rotor assembly includes a first rotor arranged circumferentially about a central axis. A second rotor is arranged circumferentially about the central axis and couples to the first rotor for rotation therewith. A balance weight assembly is configured to balance a weight distribution of the rotor assembly.

17 Claims, 9 Drawing Sheets

ROTOR ASSEMBLY FOR GAS TURBINE ENGINES WITH REPLACEABLE BALANCE WEIGHT PINS

FIELD OF THE DISCLOSURE

The present disclosure relates generally to gas turbine engines, and more specifically to rotor assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines also typically include a rotor assembly coupling the turbine with the compressor and/or a fan. Other rotor assemblies may be used for generators, motors, pumps, etc. Some gas turbine engine rotor assemblies are balanced to adjust a mass distribution of the high speed rotating components. Some rotor assembly designs must be wholly disassembled and reassembled for balancing or may be hard balanced by removing material. Such methods may be labor and time intensive.

SUMMARY

The present disclosure may comprise one or more of the following features and combinations thereof.

According to a first aspect of the disclosed embodiments, a rotor assembly adapted for use in a gas turbine engine includes a first rotor arranged circumferentially about a central axis. The first rotor has a first rotor body that extends circumferentially about the central axis and a plurality of first splines that extend radially away from the first rotor body. The rotor body is formed to define a plurality of holes that are spaced circumferentially about the first rotor body and extend radially through the first rotor body. A second rotor is arranged circumferentially about the central axis. The second rotor has a second rotor body that extends about the central axis and a plurality of second splines that engage the plurality of first splines to couple the second rotor with the first rotor for rotation therewith. A balance weight assembly is configured to balance a weight distribution of the rotor assembly. The balance weight assembly includes a plurality of pins and a retainer ring. Each of the plurality of pins extends radially through a corresponding one of the plurality of holes. The retainer ring extends circumferentially about the central axis radially inward of the first rotor and engages the plurality of pins to block radially inward movement of the plurality of pins. A portion of each of the plurality of pins is exposed by the first rotor and the second rotor to allow the portion of each of the plurality of pins to be machined to balance the rotor assembly without removing the plurality of pins from the plurality of holes.

In some embodiments of the first aspect, a head of each of the plurality of pins may be radially positioned between the retainer ring and the first rotor. The retainer ring may be coupled with the second rotor. The second rotor may include a disk that extends radially relative to the central axis. The second rotor body may be coupled with a radially outer end of the disk. The retainer ring may be coupled with the disk and may extend axially away from the disk. The plurality of first splines may be aligned axially with the plurality of second splines and the retainer ring and located radially between the plurality of second splines and the retainer ring. The plurality of pins may include at least 3 pins. The portion of each of the plurality of pins that is exposed by the first rotor and the second rotor may extend radially outward of the first rotor. The retainer ring may include a forward portion and an aft portion. The forward portion may be located radially outward of the aft portion. The forward portion may be axially located between a head of each of the plurality of pins and the second rotor.

According to a second aspect of the disclosed embodiments, a rotor assembly adapted for use in a gas turbine engine includes a first component arranged circumferentially about a central axis. The first component has a first body that extends circumferentially about the central axis. The first body is formed to define a plurality of holes that are spaced circumferentially about the first body and extend through the first body. A second component is arranged circumferentially about the central axis. The second component has a second body that extends about the central axis. A balance weight assembly is configured to balance a weight distribution of the rotor assembly. The balance weight assembly includes a pin and a retainer ring. The pin extends through a corresponding one of the plurality of holes. The retainer ring extends circumferentially about the central axis and engages the pin to block movement of the pin. A portion of the pin is exposed to allow the portion of the pin to be machined to balance the rotor assembly without removing the pin from the one of the plurality of holes.

In some embodiments of the second aspect, a head of the pin may be radially positioned between the retainer ring and the first component. The retainer ring may be coupled with the second component. The second component may include a disk that extends radially relative to the central axis. The second body may be coupled with a radially outer end of the disk. The retainer ring may be coupled with the disk and may extend away from the disk. The first component may include a plurality of first splines that engage a plurality of second splines of the second component to couple the second component with the first component for rotation therewith. The plurality of first splines may be aligned with the plurality of second splines and the retainer ring and located between the plurality of second splines and the retainer ring. The rotor assembly may include at least 3 pins. The portion of the pin that is exposed may extend radially outward of the first component. The retainer ring may include a forward portion and an aft portion. The forward portion may be located radially outward of the aft portion. The forward portion may be axially located between a head of the pin and the second component.

According to a third aspect of the disclosed embodiments, a method includes arranging a first rotor of a rotor assembly of a gas turbine engine circumferentially about a central axis. The first rotor has a first body that extends at least partway circumferentially about the central axis and a plurality of holes spaced circumferentially about the first body and extending radially through the first body. The method also includes arranging a second rotor of the rotor assembly circumferentially about the central axis. The method also includes extending a pin through the one of the plurality of holes to interlock the pin with the first rotor and prevent circumferential movement of the pin in relation to the first rotor. The method also includes determining a balance offset of the rotor assembly of the gas turbine engine. The method also includes machining the pin based on the balance offset of the rotor assembly without removing the pin from the one of the plurality of holes.

In some embodiments of the third aspect, the pin may be a first pin. The method may also include removing the first pin. The method may also include separating the first rotor and the second rotor. The method may also include recoupling the first rotor and the second rotor. The method may also include locating a second pin in the one of the plurality of holes. The method may also include determining a second offset. The method may also include machining the second pin. The method may also include locating a retainer ring circumferentially about the central axis and at least partially radially inward of the pin to prevent radial movement of the pin.

These and other features of the present disclosure will become more apparent from the following description of the illustrative embodiments.

DETAILED DESCRIPTION OF THE DRAWINGS

Figure 1:
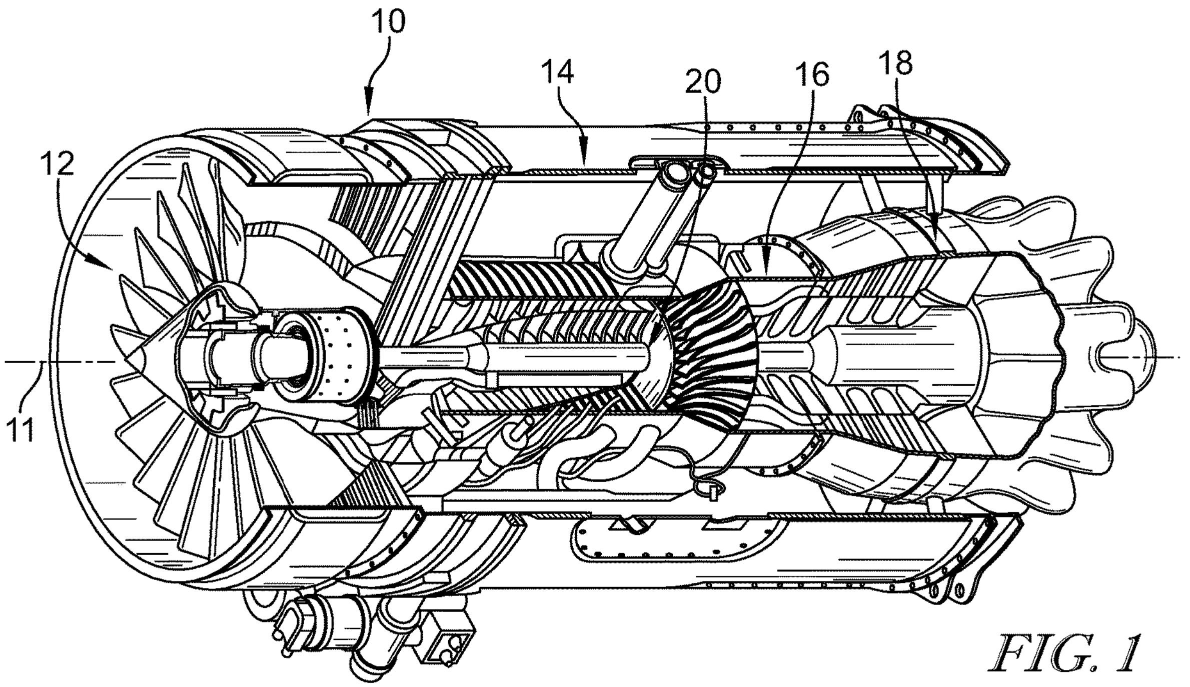
FIG. 1 is a cutaway view of a gas turbine engine that includes a fan, a compressor, a combustor downstream of the compressor, and a turbine downstream of the combustor.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16 located downstream of the compressor 14, and a turbine 18 located downstream of the combustor 16, as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

Sections of the gas turbine engine 10, such as the fan 12, compressor 14, and turbine 18, include rotor assemblies 20 that rotate about the central axis 11. Rotor assemblies 20 may include, for example, bladed wheel assemblies. The rotor assemblies 20 may be balanced during manufacture and/or assembly. Conventional rotor balancing may include removing mass from a component or adding mass via layer deposition sometimes referred to as "hard" balancing because the balance is not reversible. Such hard balancing may be useful for single components.

However, multiple components may be assembled together, balanced, used or inspected, disassembled, and then reassembled with the same components or at least some of the same components. If hard balancing is used to balance the assembled components, it becomes difficult to maintain the weight balance once the assembly is disassembled and reassembled. As an example, understanding that many of the components are annular in shape, one component may be rotated about its axis relative to another component at the reassembly stage relative to its prior assembly orientation causing the prior hard balance to no longer provide a balanced assembly of the two components.

The present disclosure provides embodiments of rotor assemblies 20 having a balance weight that interlocks with a component of the rotor to allow the balance weight to be moved circumferentially on the rotor assembly 20, made with a desired weight, and/or machined to a desired weight during the balancing process, etc. to allow for improved tolerances and easier balancing of the rotor assembly 20. As a result, the assemblies of the present disclosure may be assembled, balanced a first time, disassembled, reassembled, and balanced a second time by moving, replacing, and/or machining the balance weight(s).

Figure 2:
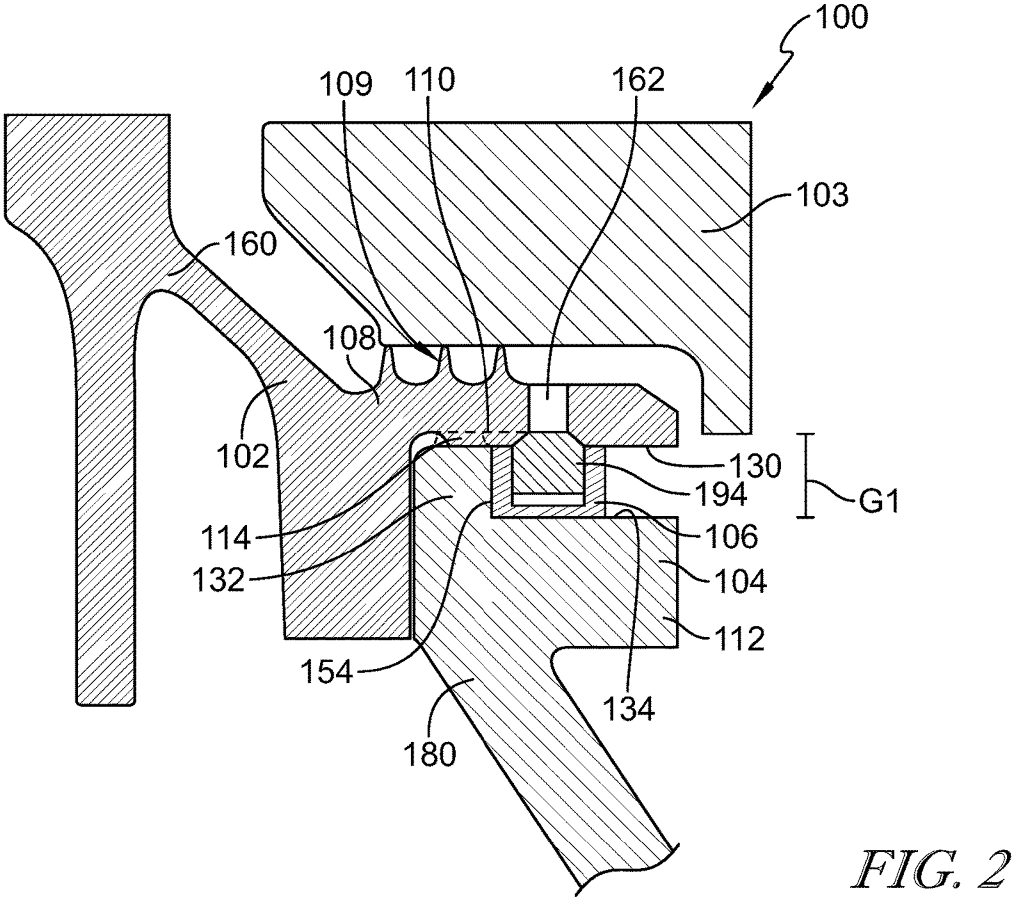
FIG. 2 is a cross-sectional view of a rotor assembly of the gas turbine engine of FIG. 1 showing the rotor assembly includes a first component having a first band that extends at least partway circumferentially about the central axis and a plurality of first splines that extend radially from the first band (radially inward of the three knife seals), a second component having a second band that extends at least partway circumferentially about the central axis and a plurality of second splines that extend radially from the second component and interlock with the plurality of first splines of the first component, and a circumferentially discrete balance weight that interlocks with the first component to prevent circumferential movement of the balance weight in relation to the first component and the second component.
Figure 3:
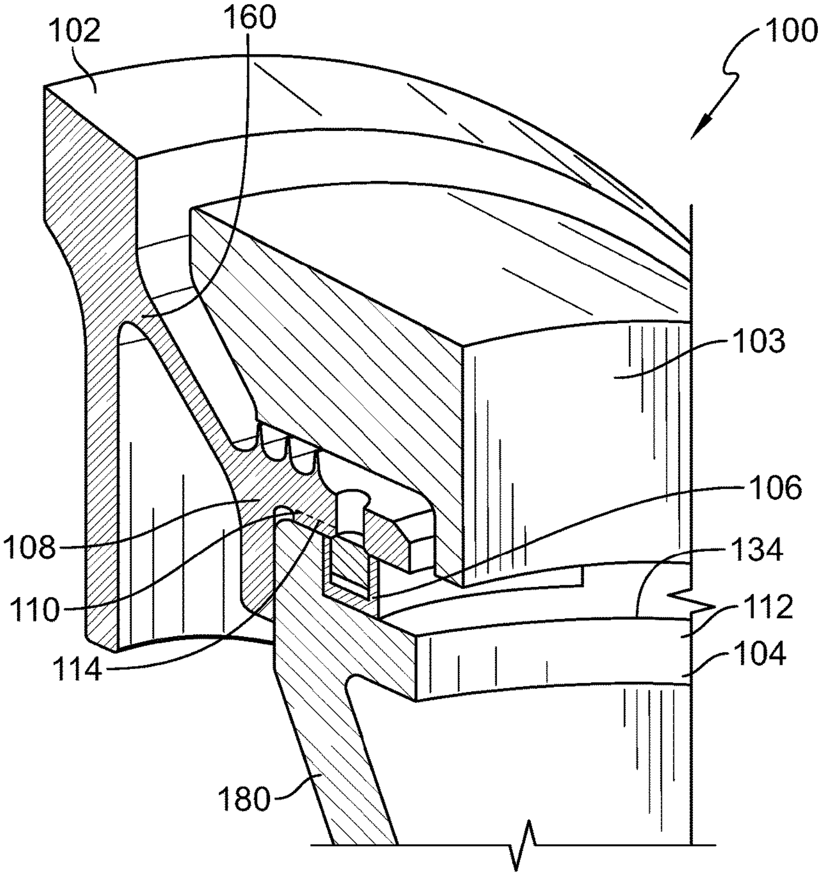
FIG. 3 is a perspective view of the rotor assembly of FIG. 2 showing the first component interlocked with the second component and the balance weight interlocked with the first component.

Referring to FIGS. 2-3, a rotor assembly 100 of the present disclosure includes a first component 102, a second component 104, and a balance weight 106. In the illustrative embodiment, the first component 102 is a first rotor and the second component 104 is a second rotor. The first component 102 is arranged circumferentially about the central axis 11. The second component 104 is arranged circumferentially about the central axis 11 and is located radially inward of the first component 102. The balance weight 106 is located radially between the first component 102 and the second component 104 and is configured to balance a weight distribution of the rotor assembly 100. The first component 102 may be a rotor shaft, bladed rotor assembly, or a disk and the second component 104 may be a rotor shaft, bladed rotor assembly, or a disk.

The first component 102 includes a first rotor body 160 that extends circumferentially about the central axis 11. A first band 108 extends axially away from the first rotor body 160 and extends at least partway circumferentially about the central axis 11. The first band 108 is defined by an inner radial surface 130 of the first component 102. A plurality of first splines 110 extend radially inward from the first band 108. In the illustrative embodiment, the first splines 110 extend radially inward toward the central axis 11. The plurality of first splines 110 extend radially inward from the first band 108 toward the second component 104. The plurality of first splines 110 are formed on the first component 102 circumferentially entirely about the central axis 11. The illustrative first component 102 further includes optional seals 109 that extend radially outward from the first band 108 toward an optional component 103 that is stationary relative to the axis 11.

The first band 108 further defines a plurality of threaded holes 162 that are spaced circumferentially about the first band 108 and extend radially through the first band 108. In the illustrative embodiment, the plurality of threaded holes 162 are spaced equally about the central axis 11. Each of the plurality of threaded holes 162 includes a threaded countersink portion 164 and a circular primary hole portion 166. The primary hole portion 166 is sized to receive a tool 176 to access the balance weight 106. The treaded countersink portion 164 is disposed at a radially inner end 168 of the hole 162 and the primary hole portion 166 is disposed at a radially outer end 170 of the hole 162. The treaded countersink portion 164 has a diameter 172 and the primary hole portion 166 has a diameter 174. In the illustrative embodiment, the diameter 172 of the threaded countersink portion 164 is greater than the diameter 174 of the primary hole portion 166.

The second component 104 includes a second rotor body 180 extending circumferentially about the central axis 11. A second band 112 extends radially and axially away from the second rotor body 180, toward the first band 108, and at least partway circumferentially about the central axis 11. The second band 112 is defined by an outer radial surface 134 of the second component 104 as shown in FIGS. 2 and 3. The second band 112 includes a shoulder 132 that extends radially outward. A plurality of second splines 114 extend radially away from the shoulder 132. The plurality of second splines 114 extend radially from the second component 104 to interlock with the plurality of first splines 110 of the first component 102 so that torque is transferred between the second component 104 and the first component 102 during rotation of the rotor assembly 100. In other embodiments, the splines 110, 114 may be omitted and other coupling means (such as press fit, bolts, radially extending splines, axial compression from other components etc.) may be used to couple the first component 102 with the second component 104.

Figure 5:
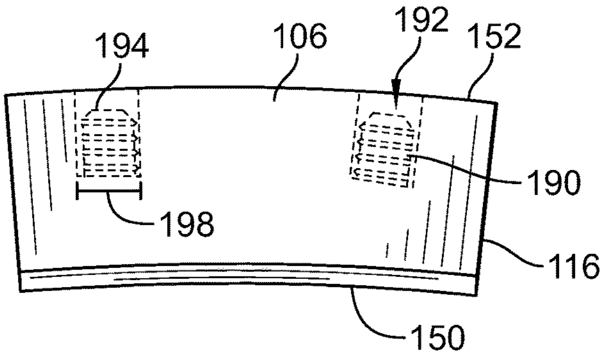
FIG. 5 is a side view of the balance weight of the rotor assembly of FIG. 2 showing the set screws positioned in a weight body of the balance weight, wherein the weight body is an arcuate shape to match an arc formed by the first band of the first component and an arc formed by the second band of the second component.
Figure 6:
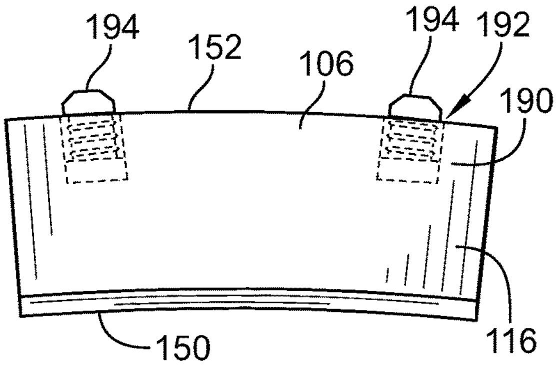
FIG. 6 is a side view of the balance weight of the rotor assembly showing the set screws extending radially from the weight body of the balance weight suggesting that the set screws are configured to thread into the first component.
Figure 7:
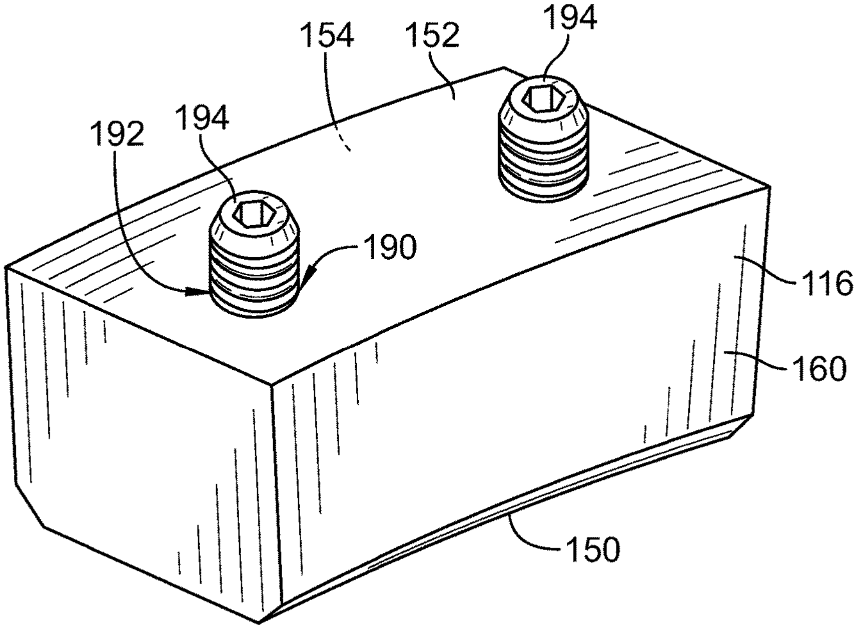
FIG. 7 is a perspective view of the balance weight of the rotor assembly of FIG. 2 showing that the balance weight is a discrete component in the circumferential direction and includes set screws that extend radially from the weight body and are positioned along a circumferential length of the weight body.

The balance weight 106 is located in a space radially between the first band 108 of the first component 102 and the second band 112 of the second component 104 and configured to balance a weight distribution of the rotor assembly 100. Referring to FIGS. 5-7, the balance weight 106 includes a weight body 116 that extends circumferentially partway about the central axis 11. The weight body 116 is located in the space radially between the first band 108 of the first component 102 and the second band 112 of the second component 104.

The weight body 116 includes an inner radial surface 150 and an outer radial surface 152. The inner radial surface 150 is continuous such that the balance weight 106 is configured to slide axially along the second band 102 of the second component 104 and into position between the first component 102 and the second component 104. The weight body 116 is an arcuate shape with the outer radial surface 152 matching an arc formed by the first component 102 and the inner radial surface 150 matching an arc formed by the second band 112 of the second component 104. The weight body 116 is formed to define one or more threaded screw holes 190 that extends radially inward from an opening 192 in the outer radial surface 152 at least partway into the weight body 116.

Figure 4:
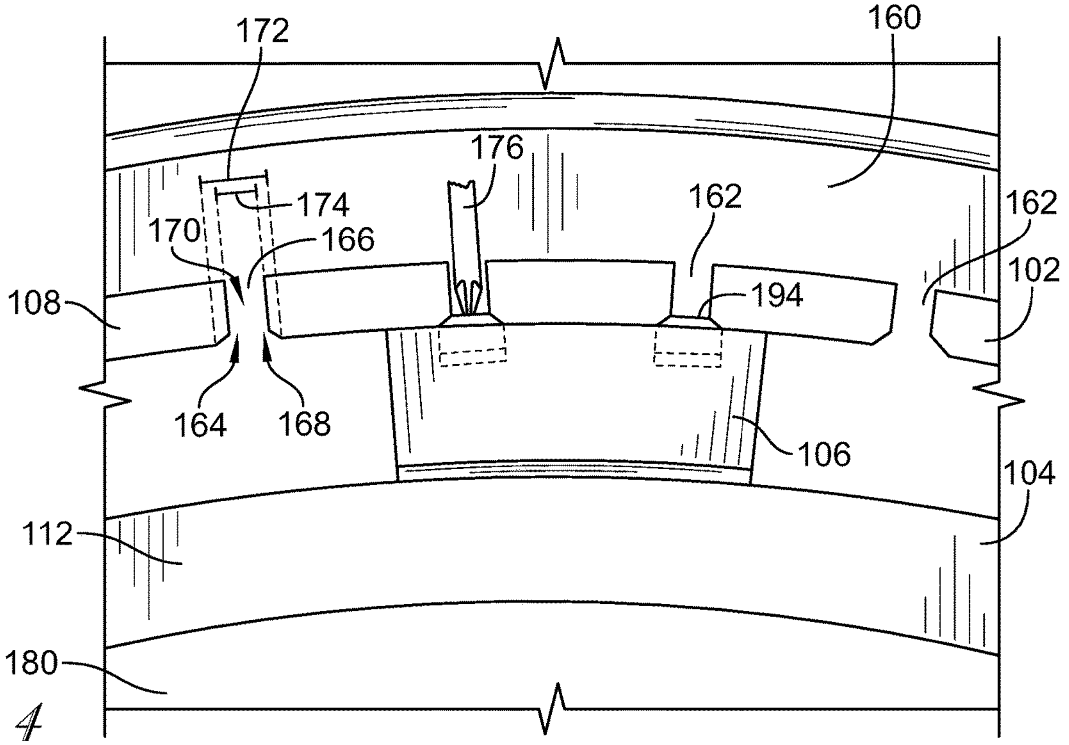
FIG. 4 is an elevation view of the rotor assembly of FIG. 3 showing that set screws included in the body of the balance weight interlock with the first component allowing the balance weight to be moved circumferentially (clocked) to adjust the balance of the assembly or re-balance the assembly if the components are separated and re-assembled.

A threaded set screw 194 is radially moveable in each threaded screw hole 190 relative to the weight body 116 into one of the plurality of threaded holes 162 to interlock the balance weight 106 with the first component 102 and prevent circumferential and axial movement of the balance weight 106 in relation to the first component 102 and the second component 104, as illustrated in FIG. 4. In the illustrated embodiment of FIGS. 4-7, the balance weight 106 includes two set screws 194 that are spaced apart so that each set screw 194 aligns with one of the plurality of threaded holes 162. It will be appreciated that, in some embodiments, the balance weight 106 includes any number of set screws 194 including one or more than one.

The set screw 194 is accessed with the tool 176 to rotate the set screw 194 and move the set screw 194 between a recessed position shown in FIG. 5 and an extended position shown in FIG. 6. In the recessed position, a radially outer end 196 of the set screw 194 is positioned radially inward of the outer radial surface 152 of the weight body 116. In the extended position, the radially outer end 196 of the set screw 194 extends into and engages at least the treaded countersink portion 164 of the threaded hole 162, as illustrated in FIG. 4. A diameter 198 of the set screw 194 is less than the diameter 172 of the threaded countersink portion 164 and greater than the diameter 174 of the primary hole portion 166 in the illustrative embodiment so that the radially outer end 196 of the set screw 194 is locked in the threaded countersink portion 164 when the set screw is moved into the one of the plurality of threaded holes 162.

The weight body 116 engages the shoulder 132 and the second band 112 of the second component 104 as suggested in FIG. 3. The inner radial surface 150 of the weight body 116 engages the second band 112 of the second component 104 while the set screw 194 is received by one of the plurality of holes 162 as shown in FIG. 4. A first axial face 154 of the weight body 116 abuts the shoulder 132 of the second component 104. The interlocking between the set screw 194 and one of the plurality of holes 162 maintains the circumferential position of the balance weight 106, as shown in FIG. 4. The positioning of the balance weight 106 radially between the first component 102 and the second component 104 maintains the radial position of the balance weight 106.

The balance weight 106 is discrete and rigid, as suggested in FIGS. 5-7. In some embodiments, the balance weight 106 is made of steel. The balance weight 106 may be made of a different material such that the balance weight 106 has an increased or decreased weight to fit the balancing needs of the rotor assembly 100. A circumferential arc length of the balance weight 106 may be increased or decreased to increase or decrease a weight of the balance weight 106. The balance weight 106 may include any number of set screws 194 that interlock with the plurality of threaded holes 162.

In the illustrative embodiment, a gap G1 is formed radially between the first band 108 of the first component 102 and the second band 112 of the second component 104. In some embodiments, the gap G1 extends circumferentially entirely about the central axis 11. A size of the gap G1 allows the balance weight 106 to be removed and separated from the first component 102 and the second component 104 while the first component 102 and the second component 104 are interlocked via the plurality of first splines 110 and the plurality of second splines 114 (The component 103 may be omitted in some embodiments and/or the assembly of the first component 102 and the second component 104 may be removed away from the component 103 without separating the first component 102 from the second component 104). Because of the size of the gap G1, the balance weight 106 may be removed from the rotor assembly 100 without disassembling the first component 102 from the second component 104. In some embodiments, the gap G1 is greater in size than a radial height of the entire balance weight 106. In some embodiments, the gap G1 is sized so that the balance weight 106, in one or more orientations, may be removed and separated from the first component 102 and the second component 104 without separating the splines of the first component 102 and the second component 104.

The balance weight 106 may be moved to a different circumferential location. The balance weight 106 may be altered through the removal or addition of material and positioned back between the first component 102 and the second component 104. Additionally, a different balance weight may be inserted between the first component 102 and the second component 104 instead of or in addition to the balance weight 106. The different balance weight may have different size dimensions and/or be made of a different material to change a weight of the balance weight compared to the prior balance weight.

Rotor assemblies may have an adjustment to the mass distribution of the assembly in order to balance and maintain an even weight distribution across the rotational axis. An uneven weight distribution of rotating components may cause unbalance such that the rotational center of the rotor assembly is out of alignment. Unbalance may impact the vibration and effectiveness of the rotor assembly.

Conventional methods, for example, hard corrections to the rotor assembly, such as machining away and removing extra material of a component, may be used to adjust the mass distribution of the rotor assembly. Such a technique results in a permanent modification to the rotor assembly. Other rotor assemblies may add components to a flange of the rotor assembly via fasteners.

In the illustrative embodiment, the balance weight 106 is used to balance the weight distribution of the rotor assembly 100. The set screws 194 of the balance weight 106 interlock with a pair of the plurality of threaded holes 162 of the first component 102 to maintain the position of the balance weight 106 in relation to the first component 102 and the second component 104. Additionally, due to the gap G1 formed by the first band 108 of the first component 102 and the second band 112 of the second component 104, the balance weight 106 may be separated from the first component 102 and the second component 104 while the first component 102 and the second component 104 remain interlocked via the plurality of first splines 110 and the plurality of second splines 114, such that disassembling the first component 102 and the second component 104 is not necessary.

The ability to separate and remove the balance weight 106 from the rotor assembly 100 without disassembling the other components 102, 104 enables the balance weight 106 to be altered and/or moved to a different circumferential location to balance the rotor assembly 100. Multiple balance weights 106 may be included in the rotor assembly 100 depending on the balance requirements of the rotor assembly 100. The balance weights 106 may be placed at different circumferential locations within the rotor assembly 100. Each balance weight 106 may be identical, or each balance weight 106 may be different.

A method of assembling the rotor assembly 100 of the gas turbine engine 10 may include several steps. The method includes arranging the first component 102 of the rotor assembly 100 circumferentially about the central axis 11. The first component 102 includes the first band 108 and the plurality of first splines 110 that extend radially from the first band 108. The method further includes arranging the second component 104 of the rotor assembly 100 circumferentially about the central axis 11. The second component 104 includes the second band 112 and the plurality of second splines 114 that extend radially from the second band 112. The method further includes interlocking the plurality of first splines 110 of the first component 102 with the plurality of second splines 114 of the second component 104. The method includes determining a balance offset of the rotor assembly 100 of the gas turbine engine 10.

The method further includes providing the balance weight 106 including the weight body 116 and the set screws 194. The method includes locating the balance weight 106 between the first component 102 and the second component 104 at a selected first circumferential position based on the balance offset of the rotor assembly 100. The method further includes interlocking each of the set screws 194 of the balance weight 106 with one of the plurality of threaded holes 162. The method further includes extending the tool 176 through the one of the plurality of holes 162 to access the set screw 194 and move the set screw 194 relative to the weight body into the one of the plurality of holes 162 to interlock the balance weight 106 with the first component 102 and prevent circumferential movement of the balance weight 106 in relation to the first component 102 and the second component 104. In the illustrative embodiment, the set screw 194 is moved radially outward to lock the set screw 194 in the threaded countersink portion 164 of the one of the plurality of holes 162.

The method may further include separating completely the balance weight 106 from the first component 102 and the second component 104 without separating the interlocked plurality of first splines 110 and the plurality of second splines 114. The method may further include, after the separating step, at least one of (i) locating the balance weight 106 between the first component 102 and the second component 104 at a selected second circumferential position different from the first circumferential position, (ii) removing or adding material to the balance weight 106 and thereafter locating the balance weight 106 between the first component 102 and the second component 104, and (iii) providing a second balance weight different from the first balance weight 106 and locating the second balance weight between the first component 102 and the second component 104.

Referring to FIGS. 8-13, another embodiment of a rotor assembly 200 in accordance with the present disclosure is shown. The rotor assembly 200 is substantially similar to the rotor assembly 100 shown in FIGS. 2-7 and described herein. Accordingly, similar reference numbers in the 200 series indicate features that are common between the rotor assembly 100 and the rotor assembly 200. The description of the rotor assembly 100 is incorporated by reference to apply to the rotor assembly 200, except in instances when it conflicts with the specific description and the drawings of the rotor assembly 200.

Figure 8:
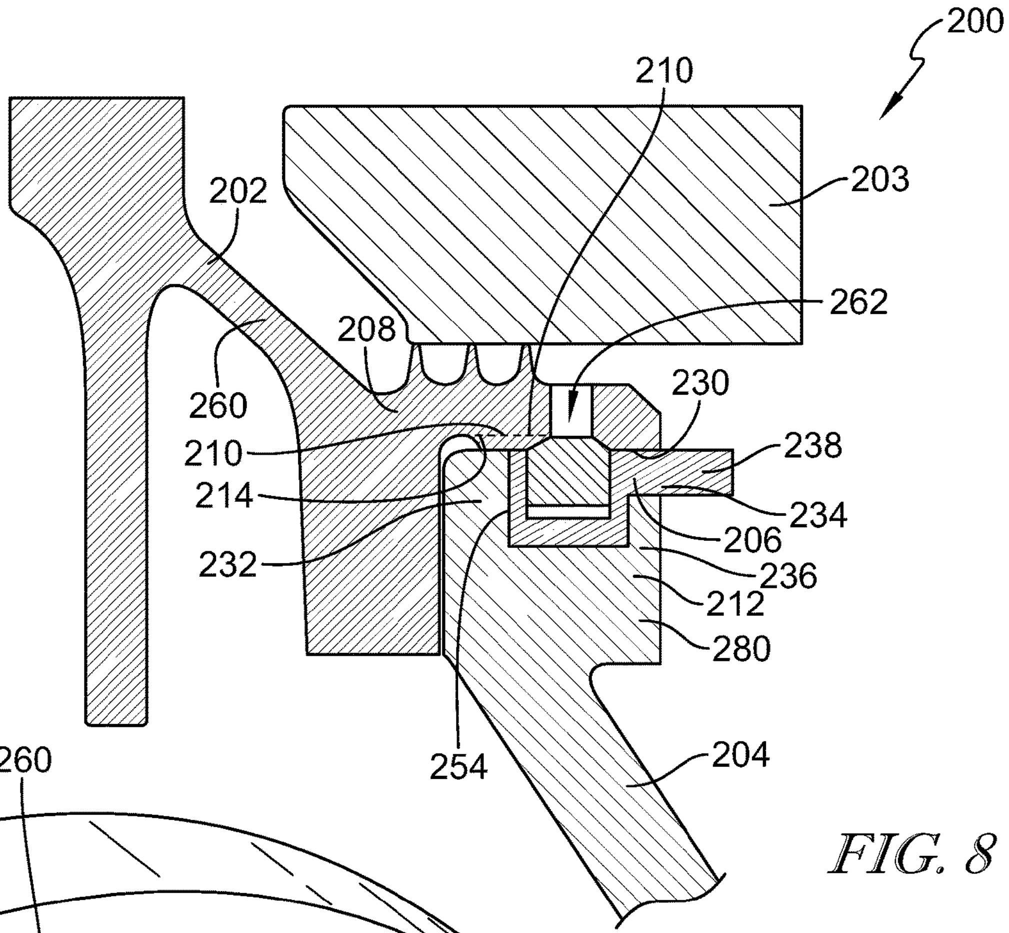
FIG. 8 is a cross-sectional view of another rotor assembly of the gas turbine engine of FIG. 1 showing the rotor assembly includes a first component having a first band that extends at least partway circumferentially about the central axis and a plurality of first splines that extend radially from the first band (located radially inward of the three knife seals), a second component having a second band that extends at least partway circumferentially about the central axis, a plurality of second splines that extend radially from the second component and interlock with the plurality of first splines of the first component, and a lip that extends radially outward from the second band, and a balance weight that interlocks with the first component to prevent circumferential movement of the balance weight in relation to the first component and the second component, wherein the balance weight includes an axially extending flange including a sacrificial layer.
Figure 9:
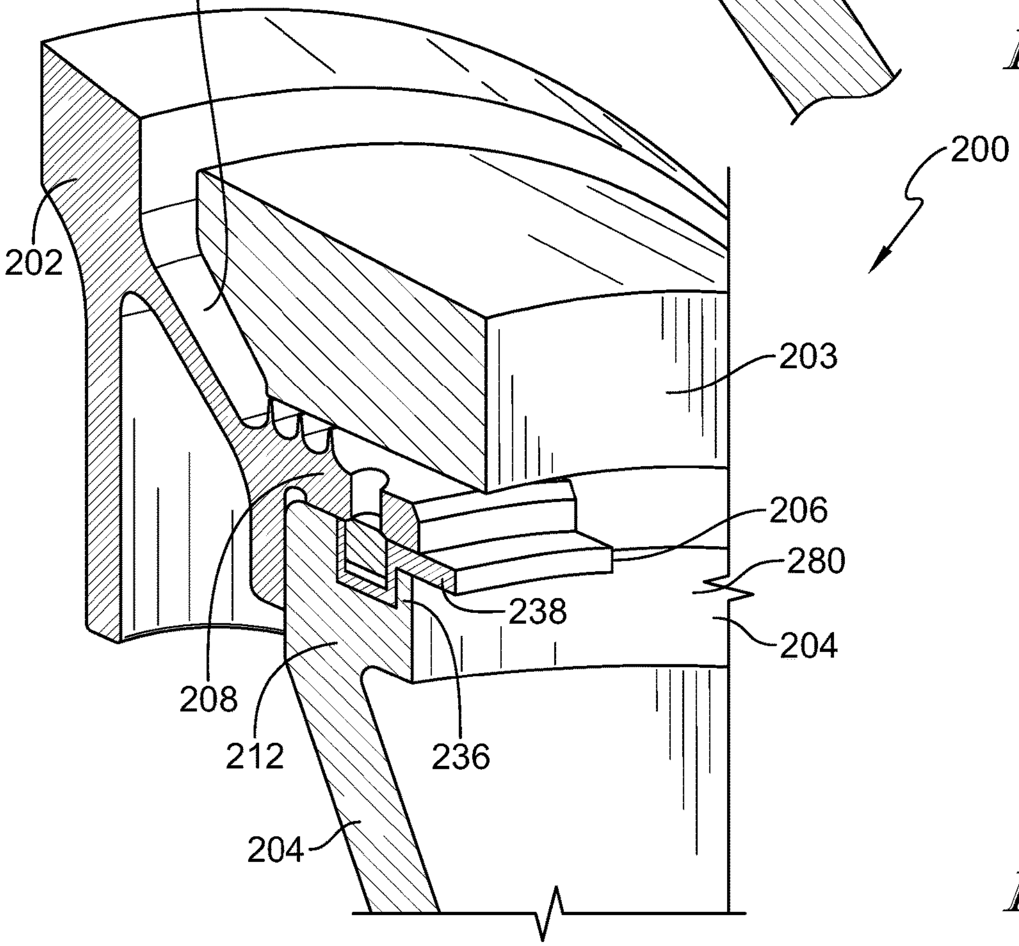
FIG. 9 is a perspective view of the rotor assembly of FIG. 8, showing the first component interlocked with the second component and the balance weight interlocked with the first component and further showing the balance weight includes a tab that extends axially to allow a user to grip and move the balance weight circumferentially to reposition the balance weight.

The rotor assembly 200 includes a first component 202, a second component 204, and a balance weight 206 as shown in FIGS. 8 and 9. In the illustrative embodiment, the first component 202 is a first rotor and the second component 204 is a second rotor. The first component 202 is arranged circumferentially about the central axis 11. The second component 204 is arranged circumferentially about the central axis 11 and is located radially inward of the first component 202. The balance weight 206 is located radially between the first component 202 and the second component 204 and is configured to balance a weight distribution of the rotor assembly 200. The first component 202 may be a bladed rotor assembly and the second component 204 may be a rotor shaft or a disk coupling the first component 202 to a rotor shaft. Likewise, the first component 202 may be a rotor shaft or a disk and the second component 204 may be a bladed rotor assembly. The first component 202 and the second component 204 may be located adjacent third component 203.

The first component 202 includes a first rotor body 260 that extends circumferentially about the central axis 11. A first band 208 extends axially away from the first rotor body 260 and extends at least partway circumferentially about the central axis 11. The first band 208 defines an inner radial surface 230 of the first component 202. A plurality of first splines 210 extend radially inward from the first band 208. In the illustrative embodiment, the first splines 210 extend radially inward toward the central axis 11. The plurality of first splines 210 extend radially inward from the first band 208 toward the second component 204. The plurality of first splines 210 are formed on the first component 202 circumferentially entirely about the central axis 11.

Figure 10:
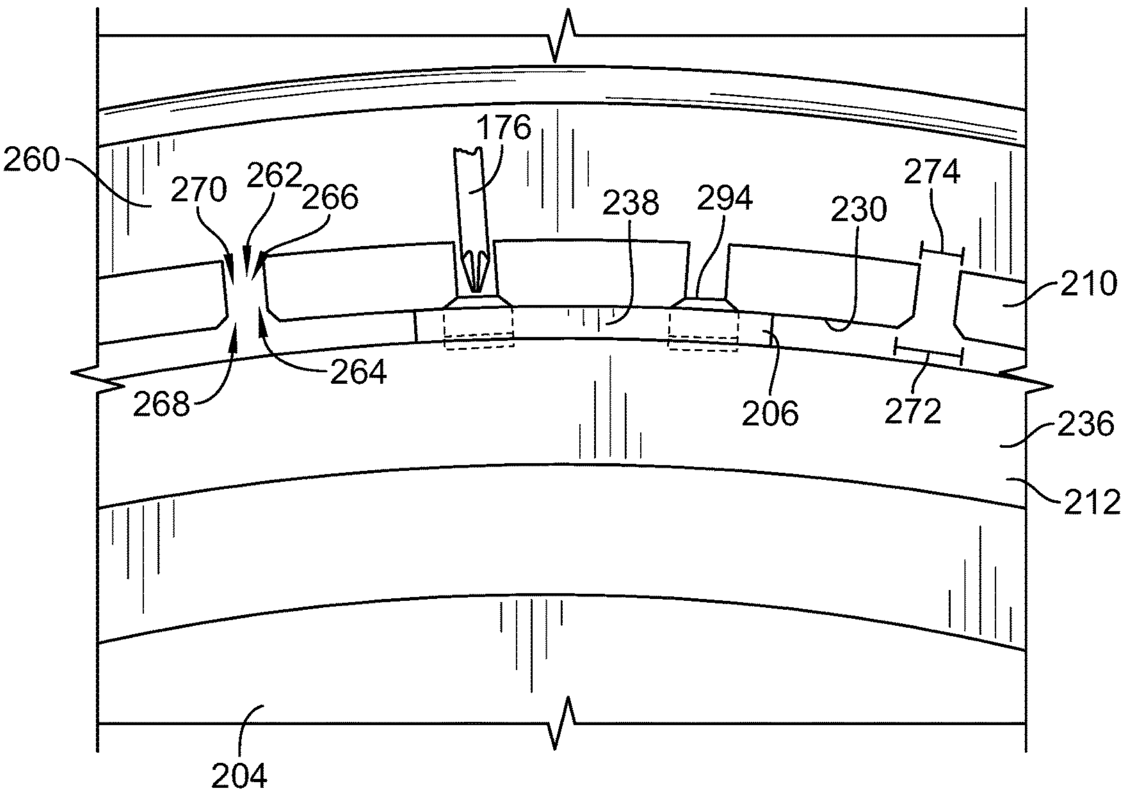
FIG. 10 is an elevation view of the rotor assembly of FIG. 9 showing that the set screws of the body weight interlock with the first component to allow the balance weight to removeably coupled with the first component.

The first band 208 further defines a plurality of threaded holes 262 that are spaced circumferentially about the first band 208 and extend radially through the first band 208 as shown in FIGS. 8-10. In the illustrative embodiment, the plurality of threaded holes 262 are spaced equally about the central axis 11. Each of the plurality of threaded holes 262 includes a threaded countersink portion 264 and a circular primary hole portion 266. The primary hole portion 266 is sized to receive a tool 276 to access the balance weight 206. The treaded countersink portion 264 is disposed at a radially inner end 268 of the hole 262 and the primary hole portion 266 is disposed at a radially outer end 270 of the hole 262. The treaded countersink portion 264 has a diameter 272 and the primary hole portion 266 has a diameter 274. In the illustrative embodiment, the diameter 272 of the threaded countersink portion 264 is greater than the diameter 274 of the primary hole portion 266.

The second component 204 includes a second rotor body 280 extending circumferentially about the central axis 11. A second band 212 extends radially away from the second rotor body 280, toward the first band 208, and at least partway circumferentially about the central axis 11. The second band 212 defines an outer radial surface 234 of the second component 204. A shoulder 232 of the second band 212 extends radially outward. A plurality of second splines 214 extend radially away from the second band 212 and radially outward from the shoulder 232. The plurality of second splines 214 extend radially from the second component 204 to interlock with the plurality of first splines 210 of the first component 202 so that torque is transferred between the second component 204 and the first component 202 during rotation of the rotor assembly 200. The second component 204 further includes a lip 236 that extends radially outward away from the second band 212. The lip 236 is spaced apart axially from the plurality of second splines 214 to locate the balance weight 206 axially between the plurality of second splines 214 and the lip 236 to block axial movement of the balance weight 206.

Figure 11:
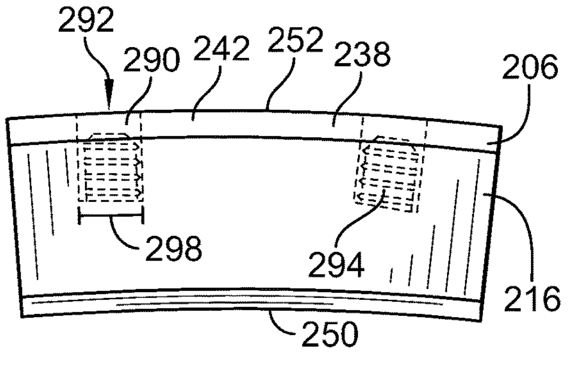
FIG. 11 is a side view of the balance weight of the rotor assembly showing the set screws positioned in a weight body of the balance weight, wherein the weight body is an arcuate shape to match an arc formed by the first band of the first component and an arc formed by the second band of the second component.
Figure 12:
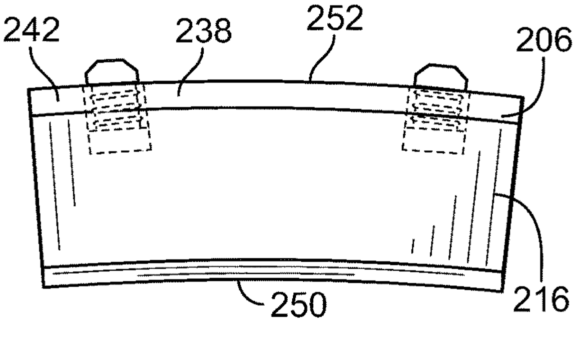
FIG. 12 is a side view of the balance weight of the rotor assembly similar to FIG. 11 showing the set screws extending radially from the weight body of the balance weight and suggesting that the set screws are configured to thread into the first component.
Figure 13:
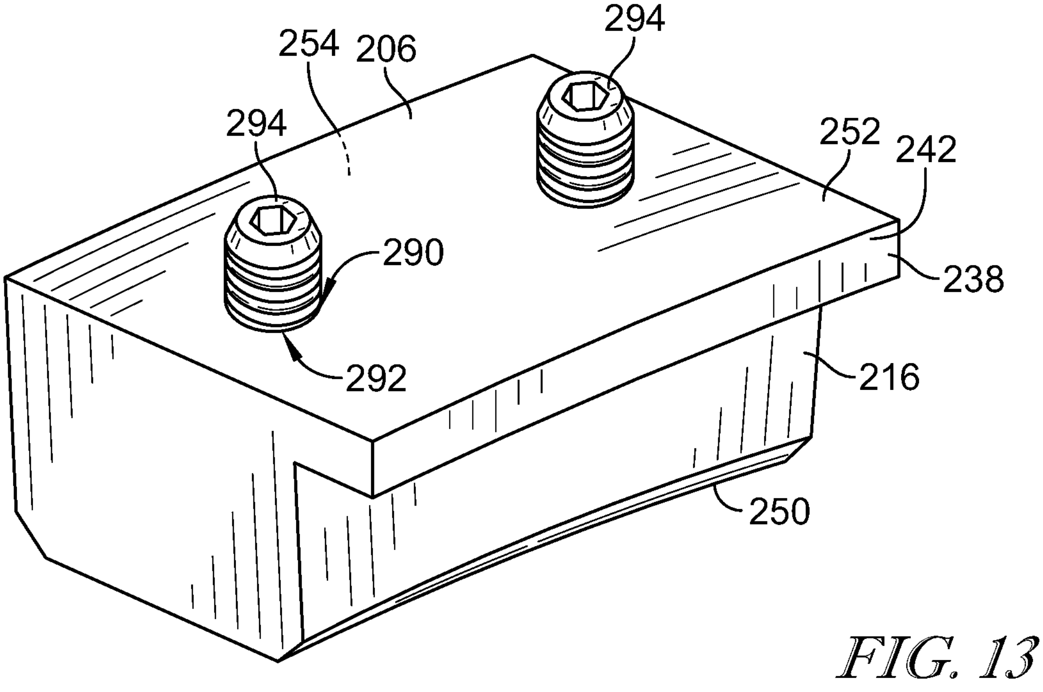
FIG. 13 is a perspective view of the balance weight of the rotor assembly showing that the balance weight is a discrete component and includes set screws that extend radially from the weight body and are positioned along a circumferential length of the weight body.
Figure 14:
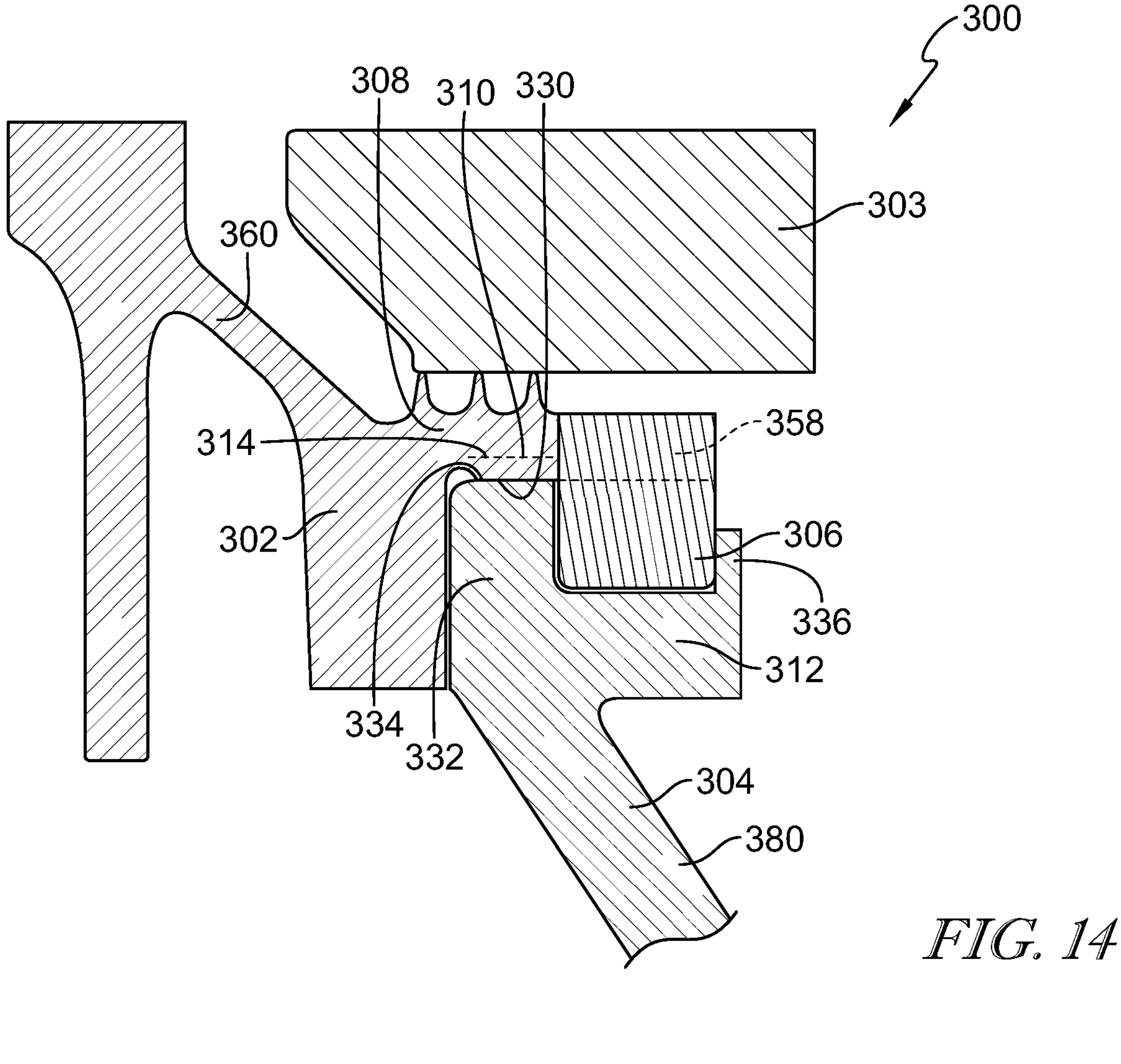
FIG. 14 is a cross-sectional view of another rotor assembly of the gas turbine engine of FIG. 1 showing the rotor assembly includes a first component having a first band that extends at least partway circumferentially about the central axis, a plurality of first splines that extend radially from the first band, and a tab that extends axially from the first band, a second component having a second band that extends at least partway circumferentially about the central axis, a plurality of second splines that extend radially from the second component and interlock with the plurality of first splines of the first component, and a balance weight having a groove that interlocks with the first component to prevent circumferential movement of the balance weight in relation to the first component and the second component.
Figure 15:
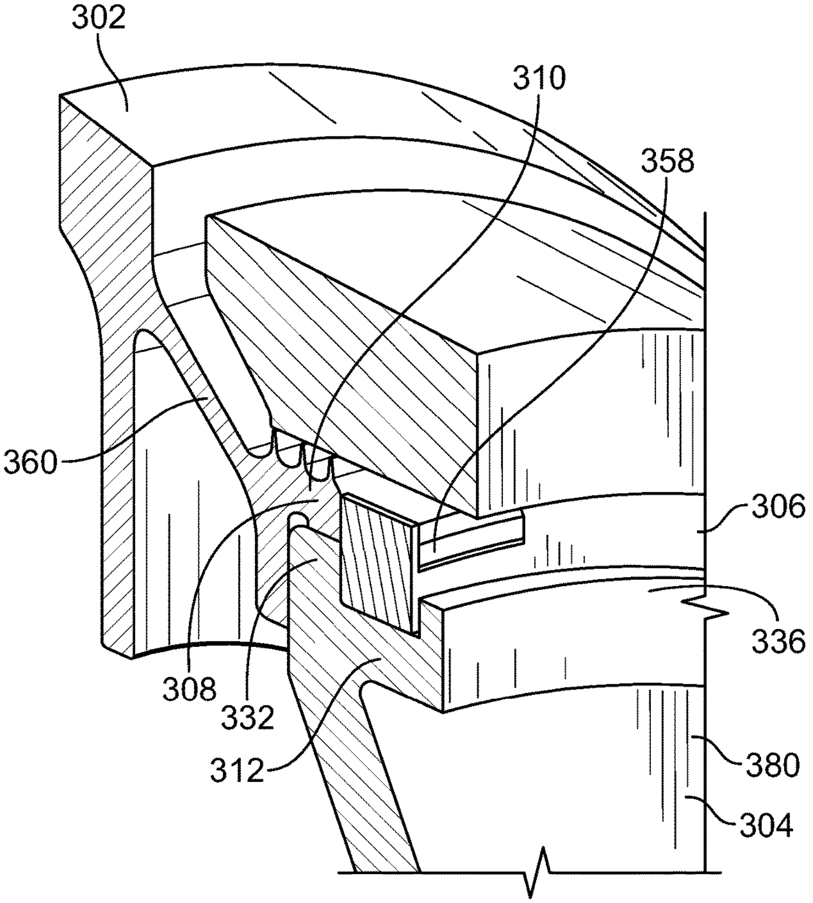
FIG. 15 is a perspective view of the rotor assembly of FIG. 14, showing the first component interlocked with the second component and the balance weight interlocked with the first component.

The balance weight 206 is located in a space radially between the first band 208 of the first component 202 and the second band 212 of the second component 204 and configured to balance a weight distribution of the rotor assembly 200. Referring to FIGS. 11-13, the balance weight 206 includes a weight body 216 that extends circumferentially partway about the central axis 11. The weight body 216 is located in the space radially between the first band 208 of the first component 202 and the second band 212 of the second component 204. The weight body 216 includes an inner radial surface 250 and an outer radial surface 252. The weight body 216 is an arcuate shape with the outer radial surface 252 matching an arc formed by the first component 202 and the inner radial surface 250 matching an arc formed by the second band 212 of the second component 204.

A flange 238 extends axially away from the weight body 216 as shown in FIGS. 9 and 13. In some embodiments, the flange 238 extends axially aft of the weight body 216. The flange 238 provides sacrificial material 242 that can be machined without removing the balance weight 206 from the space radially between the first component 202 and the second component 204. The flange 238 may also be gripped by a user or a tool to move the weight body 216 circumferentially. The weight body 216 is formed to define a threaded screw hole 290 that extends radially inward from an opening 292 in the outer radial surface 252 at least partway into the weight body 216.

A threaded set screw 294 is radially moveable in the threaded screw hole 290 relative to the weight body 216 into one of the plurality of threaded holes 262 to interlock the balance weight 206 with the first component 202 and prevent circumferential and axial movement of the balance weight 206 in relation to the first component 202 and the second component 204, as illustrated in FIG. 10. In the illustrated embodiment of FIGS. 10-13, the balance weight 206 includes two set screws 294 that are spaced apart so that each set screw 294 aligns with one of the plurality of threaded holes 262. It will be appreciated that, in some embodiments, the balance weight 206 includes any number of set screws 294 including one or more than one.

The set screw 294 is accessed with the tool 176 to rotate the set screw 294 and move the set screw 294 between a recessed position shown in FIG. 11 and an extended position shown in FIG. 12. In the recessed position, a radially outer end 296 of the set screw 294 is positioned radially inward of the outer radial surface 252 of the weight body 216. In the extended position, the radially outer end 296 of the set screw 294 extends into and engages the treaded countersink portion 264 of the threaded hole 262, as illustrated in FIG. 10. A diameter 298 of the set screw 294 is less than the diameter 272 of the threaded countersink portion 264 and greater than the diameter 274 of the primary hole portion 266 so that the radially outer end 296 of the set screw 294 is locked in the threaded countersink portion 264 when the set screw is moved into the one of the plurality of threaded holes 262.

The weight body 216 engages the shoulder 232 and the second band 212 of the second component 204. The inner radial surface 250 of the weight body 216 engages the second band 212 of the second component 204 while the set screw 294 is received by one of the plurality of holes 262. A first axial face 254 of the weight body 216 abuts the shoulder 232 of the second component 204. The flange 238 of the weight body 216 extends beyond an edge of the lip 236 to allow the flange 238 to be accessed to allow repositioning of the balance weight 206 circumferentially without removing the balance weight 206 from the space radially between the first component 202 and the second component 204. In some embodiments, at least a portion of sacrificial material 242 of the flange 238 is removable to balance the weight distribution of the rotor assembly 200.

The interlocking between the set screw 294 and one of the plurality of holes 262 maintains the circumferential position of the balance weight 206, as shown in FIG. 4. The positioning of the balance weight 206 radially between the first component 202 and the second component 204 maintains the radial position of the balance weight 206. The positioning of the balance weight 206 axially between the shoulder 231 and the lip 236 maintains an axial position of the balance weight 206.

The balance weight 206 is discrete and rigid as suggested in FIGS. 11-13. In some embodiments, the balance weight 206 is made of steel. The balance weight 206 may be made of a different material such that the balance weight 206 has an increased or decreased weight to fit the balancing needs of the rotor assembly 200. A circumferential arc length of the balance weight 206 may be increased or decreased to increase or decrease a weight of the balance weight 206. The balance weight 206 may include any number of set screws 294 that interlock with the plurality of threaded holes 262.

The balance weight 206 may be moved to a different circumferential location. The balance weight 206 may be altered through the removal of the sacrificial material 242. Additionally, a different balance weight may be inserted between the first component 202 and the second component 204 instead of or in addition to the balance weight 206. Any portion of the balance weight 206 may have material removed such as the flange 238, faces 250, 252, 254, etc.

In the illustrative embodiment, the balance weight 206 is used to balance the weight distribution of the rotor assembly 200. The set screws 294 of the balance weight 206 interlock with a pair of the plurality of threaded holes 262 of the first component 202 to maintain the position of the balance weight 206 in relation to the first component 202 and the second component 204. Additionally, the flange 138 of the balance weight 206 allows circumferential movement of the balance weight 206 while the first component 202 and the second component 204 remain interlocked via the plurality of first splines 210 and the plurality of second splines 214, such that disassembling the first component 202 and the second component 204 is not necessary. The ability to alter or move the balance weight 206 without disassembling the other components 202, 204 enables the balance weight 206 to be altered and/or moved to a different circumferential location to balance the rotor assembly 200.

Multiple balance weights 206 may be included in the rotor assembly 200 depending on the balance requirements of the rotor assembly 200. The balance weights 206 may be placed at different circumferential locations within the rotor assembly 200. Each balance weight 206 may be identical, or each balance weight 206 may be different.

A method of assembling the rotor assembly 200 of the gas turbine engine 10 may include several steps. The method includes arranging the first component 202 of the rotor assembly 200 circumferentially about the central axis 11. The first component 202 includes the first band 208 and the plurality of first splines 210 that extend radially from the first band 208. The method further includes arranging the second component 204 of the rotor assembly 200 circumferentially about the central axis 11. The second component 204 includes the second band 212 and the plurality of second splines 214 that extend radially from the second band 212. The method further includes interlocking the plurality of first splines 210 of the first component 202 with the plurality of second splines 214 of the second component 204. The method includes determining a balance offset of the rotor assembly 200 of the gas turbine engine 10.

The method further includes providing the balance weight 206 including the weight body 216 and the set screws 294. The method includes locating the balance weight 206 between the first component 202 and the second component 204 at a selected first circumferential position based on the balance offset of the rotor assembly 100. The weight body 216 is positioned forward of the lip 236 that extends radially outward from the second band 212 of the second component 204 to prevent aft movement of the balance weight 206. The method further includes interlocking each of the set screws 294 of the balance weight 206 with one of the plurality of threaded holes 262.

The method further includes extending the tool 176 through the one of the plurality of holes 262 to access the set screw 294 and move the set screw 294 relative to the weight body into the one of the plurality of holes 262 to interlock the balance weight 206 with the first component 202 and prevent circumferential movement of the balance weight 206 in relation to the first component 202 and the second component 204. In the illustrative embodiment, the set screw 294 is moved radially outward to lock the set screw 294 in the threaded countersink portion 264 of the one of the plurality of holes 262.

The method may further include moving the balance weight 206 circumferentially without separating the interlocked plurality of first splines 210 and the plurality of second splines 214. The method may further include removing at least a portion of sacrificial material 242 from the flange 238 extending axially away from the weight body 216 to balance the weight distribution of the rotor assembly 200.

The method may further include, at least one of (i) locating the balance weight 206 between the first component 202 and the second component 204 at a selected second circumferential position different from the first circumferential position, (ii) removing or adding material to the balance weight 206 and thereafter locating the balance weight 206 between the first component 202 and the second component 204, and (iii) providing a second balance weight different from the first balance weight 206 and locating the second balance weight between the first component 202 and the second component 204.

Referring to FIGS. 14-17, another embodiment of a rotor assembly 300 in accordance with the present disclosure is shown. The rotor assembly 300 is substantially similar to the rotor assembly 100 shown in FIGS. 2-7 and described herein. Accordingly, similar reference numbers in the 300 series indicate features that are common between the rotor assembly 100 and the rotor assembly 300. The description of the rotor assembly 100 is incorporated by reference to apply to the rotor assembly 300, except in instances when it conflicts with the specific description and the drawings of the rotor assembly 300.

The rotor assembly 300 of the present disclosure includes a first component 302, a second component 304, and a balance weight 306. In the illustrative embodiment, the first component 302 is a first rotor and the second component 304 is a second rotor that are arranged adjacent a third component 303. The first component 302 is arranged circumferentially about the central axis 11. The second component 304 is arranged circumferentially about the central axis 11 and is located radially inward of the first component 302. The balance weight 306 is located radially between the first component 302 and the second component 304 and is configured to balance a weight distribution of the rotor assembly 300. The first component 302 may be a bladed rotor assembly and the second component 304 may be a rotor shaft or a disk coupling the first component 302 to a rotor shaft. Likewise, the first component 302 may be a rotor shaft or a disk and the second component 304 may be a bladed rotor assembly.

The first component 302 includes a first rotor body 360 that extends circumferentially about the central axis 11. A first band 308 extends axially away from the first rotor body 360 and extends at least partway circumferentially about the central axis 11. The first band 308 defines an inner radial surface 330 of the first component 302. A plurality of first splines 310 extend radially inward from the first band 308. In the illustrative embodiment, the first splines 310 extend radially inward toward the central axis 11. The plurality of first splines 310 extend radially inward from the first band 308 toward the second component 304. The plurality of first splines 310 are formed on the first component 302 circumferentially entirely about the central axis 11. A discrete first tab 358 extends axially aft away from the first band 308.

The second component 304 includes a second rotor body 380 extending circumferentially about the central axis 11. A second band 312 extends radially away from the second rotor body 380, toward the first band 308, and at least partway circumferentially about the central axis 11. The second band 312 defines an outer radial surface 334 of the second component 304. A shoulder 332 of the second band 312 extends radially outward. A plurality of second splines 314 extend radially away from the second band 312 and radially outward from the shoulder 332. The plurality of second splines 314 extend radially from the second component 304 to interlock with the plurality of first splines 310 of the first component 302 so that torque is transferred between the second component 304 and the first component 302 during rotation of the rotor assembly 300. The second component 304 further includes a lip 336 that extends radially outward away from the second band 312. The lip 336 is spaced apart axially from the plurality of second splines 314 to locate the balance weight 306 axially between the plurality of second splines 314 and the lip 336 to block axial movement of the balance weight 306.

Figure 17:
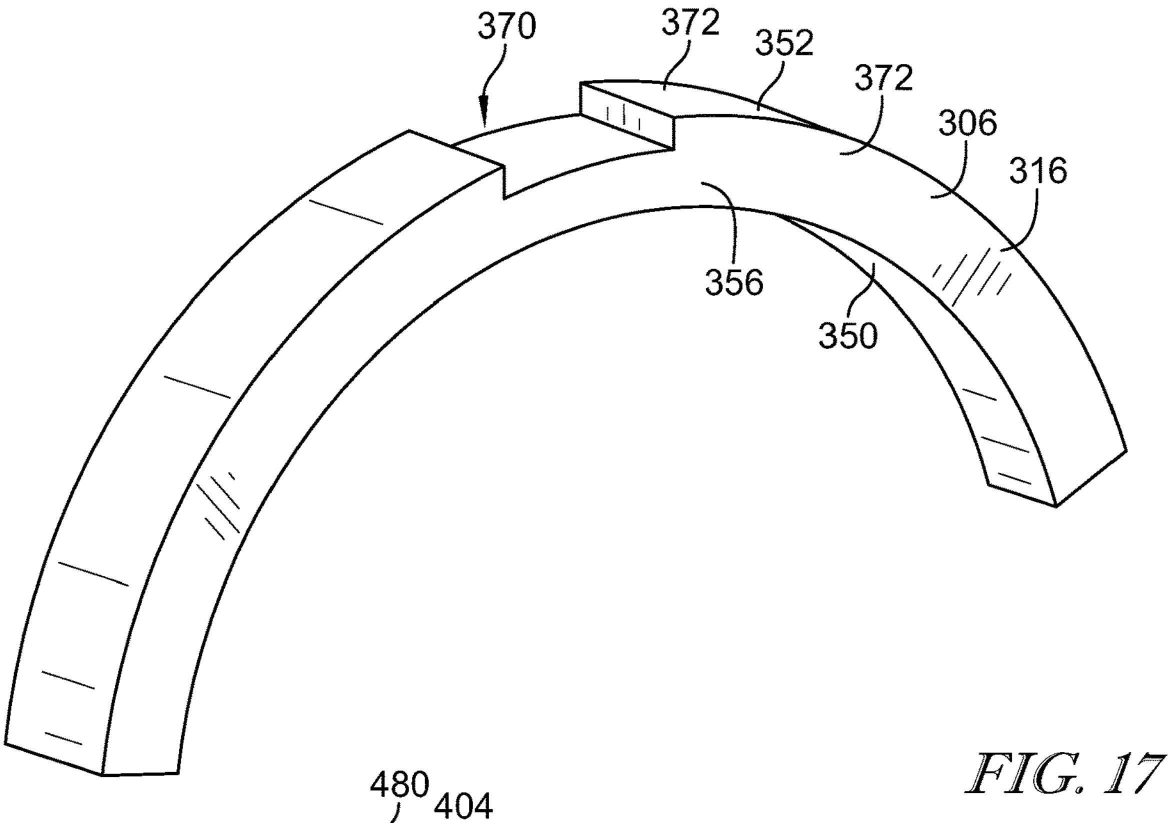
FIG. 17 is a perspective view of the balance weight of the rotor assembly showing that the balance weight is a discrete and arcuate component and includes the groove that extends axially through the balance weight.

The balance weight 306 is located in a space radially between the first band 308 of the first component 302 and the second band 312 of the second component 304 and configured to balance a weight distribution of the rotor assembly 300. Referring to FIG. 17, the balance weight 306 includes a weight body 316 that extends circumferentially partway about the central axis 11. The weight body 316 is located in the space radially between the first band 308 of the first component 302 and the second band 312 of the second component 304. The weight body 316 includes an inner radial surface 350 and an outer radial surface 352. The weight body 316 is an arcuate shape with the outer radial surface 352 matching an arc formed by the first component 302 and the inner radial surface 350 matching an arc formed by the second band 312 of the second component 304. The balance weight 306 provides sacrificial material for balancing the rotor assembly 300. For example, material may be removed from the forward axial face 356 and/or the outer radial surface 352 without separating the first component 302 from the second component 304. Other faces 350, 354 of the balance weight 306 may be machined to have material removed by separating the first component 302 from the second component 304.

Figure 16:
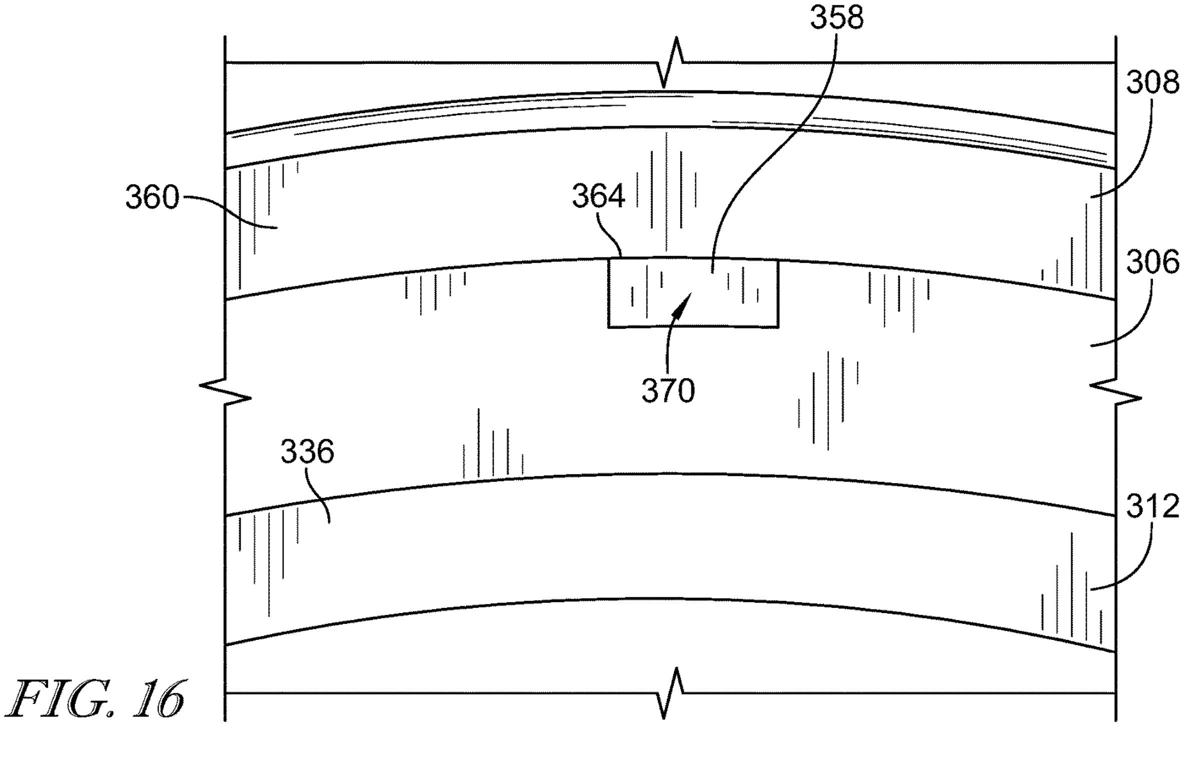
FIG. 16 is an elevation view of the rotor assembly of FIG. 15 showing the tab of the first band interlocked with the groove of the balance weight.

The balance weight 306 is formed to define a groove 370 that receives the first tab 358 of the first component 302 to block circumferential movement of the balance weight 306 relative to the first component 302 and the second component 304. The balance weight 306 has an axial width about equal to the axial distance that the first tab 358 extends away from the first band 308. The outer radial surface 352 of the balance weight 306 is about flush with the outer radial surface 364 of the tab 358 as shown in FIG. 16. The outer radial surface 352 of the weight body 316 is configured to be machined as a sacrificial layer 372 to allow for balance correction of the rotor assembly 300 without machining the first component 302 and the second component 304.

In some embodiments, the balance weight 306 extends circumferentially 180 degrees about the central axis 11. In some embodiments, a discrete second tab extends axially aft away from the first band 312 and a second balance weight engages the discrete second tab. In some embodiments, the second balance weight extends circumferentially 180 degrees about the central axis 11 so that the balance weight 306 and the second balance weight abut one another to extend circumferentially 360 degrees about the central axis 11.

The weight body 316 engages the shoulder 332 and the second band 312 of the second component 304. The inner radial surface 350 of the weight body 316 engages the second band 312 of the second component 304. A first axial face 354 of the weight body 316 abuts the shoulder 332 of the second component 304. The interlocking between the tab 358 and the groove 370 maintains the circumferential position of the balance weight 306, as shown in FIG. 16. The positioning of the balance weight 306 radially between the first component 302 and the second component 304 maintains the radial position of the balance weight 306. The positioning of the balance weight 306 axially between the shoulder 331 and the lip 336 maintains an axial position of the balance weight 306.

The balance weight 306 is discrete and rigid as suggested in FIG. 17. In some embodiments, the balance weight 306 is made of steel. The balance weight 306 may be made of a different material such that the balance weight 306 has an increased or decreased weight to fit the balancing needs of the rotor assembly 100. A circumferential arc length of the balance weight 306 may be increased or decreased to increase or decrease a weight of the balance weight 306.

The balance weight 306 may be altered through the removal of the sacrificial material 372. Additionally, a different balance weight may be inserted between the first component 302 and the second component 304 instead of or in addition to the balance weight 306.

In the illustrative embodiment, the balance weight 306 is used to balance the weight distribution of the rotor assembly 300. The groove 370 of the balance weight 306 interlocks with the tab 358 of the first component 302 to maintain the position of the balance weight 306 in relation to the first component 302 and the second component 304. Additionally, the sacrificial material 372 is configured to be machined while the first component 302 and the second component 304 remain interlocked via the plurality of first splines 310 and the plurality of second splines 314, such that disassembling the first component 302 and the second component 304 is not necessary.

Multiple balance weights 306 may be included in the rotor assembly 300 depending on the balance requirements of the rotor assembly 300. The balance weights 306 may be placed at different circumferential locations within the rotor assembly 300. Each balance weight 306 may be identical, or each balance weight 306 may be different.

A method of assembling the rotor assembly 300 of the gas turbine engine 10 may include several steps. The method includes arranging the first component 302 of the rotor assembly 300 circumferentially about the central axis 11. The first component 302 includes the first band 308 and the plurality of first splines 310 that extend radially from the first band 308. The method further includes arranging the second component 304 of the rotor assembly 300 circumferentially about the central axis 11. The second component 304 includes the second band 312 and the plurality of second splines 314 that extend radially from the second band 312. The method further includes interlocking the plurality of first splines 310 of the first component 302 with the plurality of second splines 314 of the second component 304. The method includes determining a balance offset of the rotor assembly 300 of the gas turbine engine 10.

The method further includes locating the balance weight 306 so that the groove 370 defined in the balance weight 306 receives the first tab 358 of the first component 302 to block circumferential movement of the balance weight 306 relative to the first component 302 and the second component 304. The method may further include removing at least a portion of sacrificial material 372 from the balance weight 306 to balance the weight distribution of the rotor assembly 200.

The method may further include, at least one of (i) locating the balance weight 306 between the first component 302 and the second component 304 at a selected second circumferential position different from the first circumferential position, (ii) removing or adding material to the balance weight 306 and thereafter locating the balance weight 306 between the first component 302 and the second component 304, and (iii) providing a second balance weight different from the first balance weight 306 and locating the second balance weight between the first component 302 and the second component 304.

Figure 18:
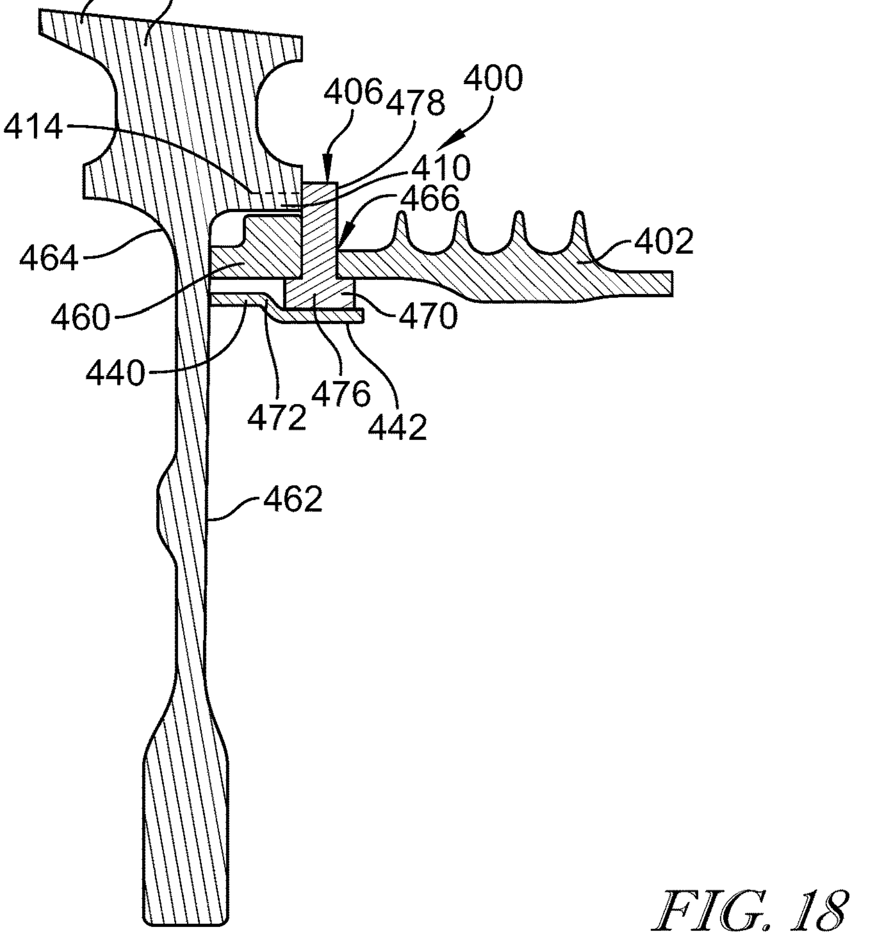
FIG. 18 is a cross-sectional view of another rotor assembly of the gas turbine engine of FIG. 1 showing the rotor assembly includes a first component having a first band that extends at least partway circumferentially about the central axis, a second component having a second band that extends at least partway circumferentially about the central axis, and a plurality of pins that interlocks with the first component and are configured to have material removed to balance the assembly.
Figure 19:
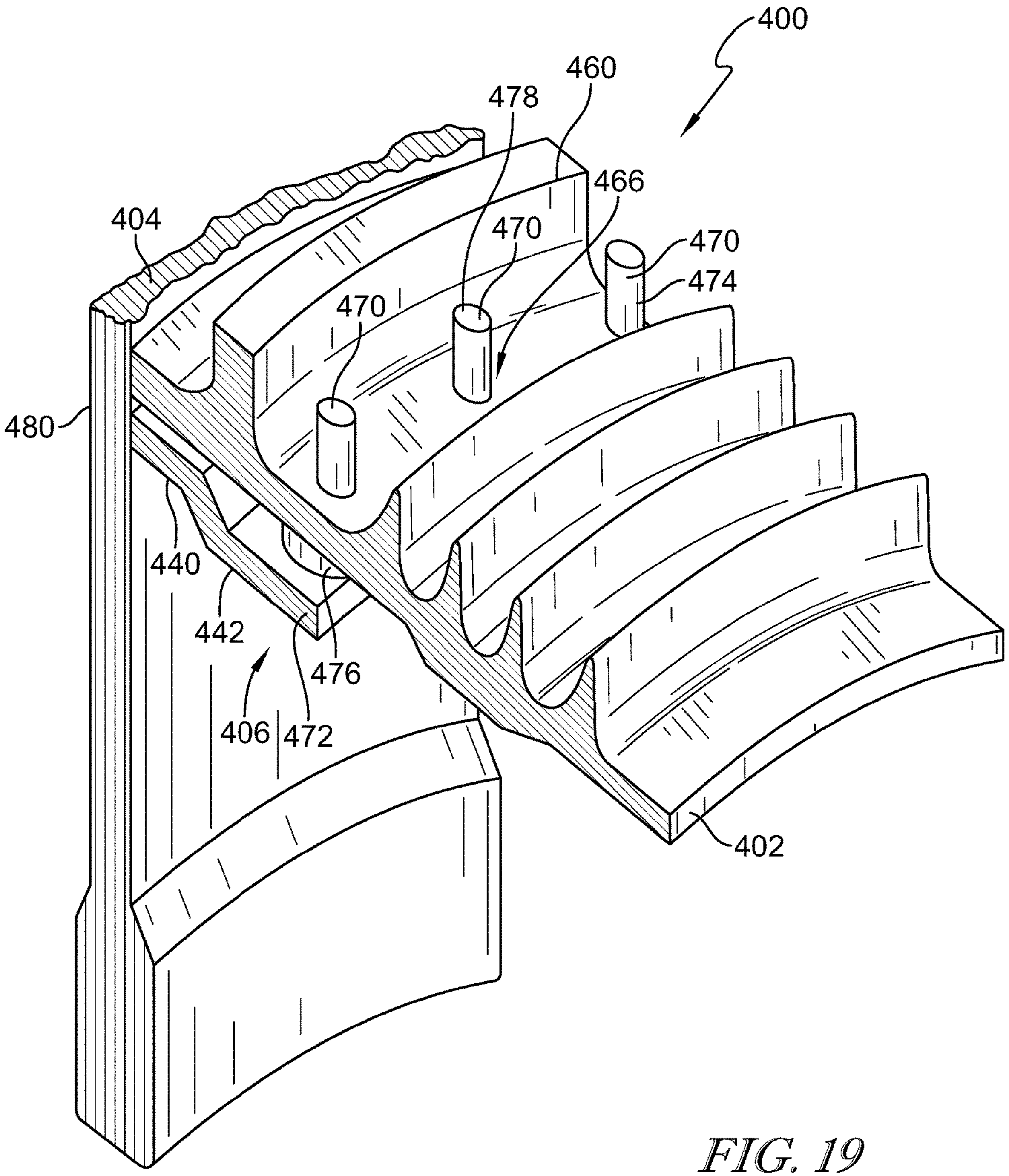
FIG. 19 is a perspective view of the rotor assembly of FIG. 18, showing the pins interlocked with the first component.

Referring to FIGS. 18-19, another embodiment of a rotor assembly 400 in accordance with the present disclosure is shown. The rotor assembly 400 is substantially similar to the rotor assembly 100 shown in FIGS. 2-7 and described herein. Accordingly, similar reference numbers in the 400 series indicate features that are common between the rotor assembly 100 and the rotor assembly 400. The description of the rotor assembly 100 is incorporated by reference to apply to the rotor assembly 400, except in instances when it conflicts with the specific description and the drawings of the rotor assembly 400.

The rotor assembly 400 of the present disclosure includes a first component 402, a second component 404, and a balance weight assembly 406. In the illustrative embodiment, the first component 402 is a first rotor and the second component 404 is a second rotor. The first component 402 is arranged circumferentially about the central axis 11. The second component 404 is arranged circumferentially about the central axis 11 and is located axially forward of the first component 402. The balance weight assembly 406 is configured to balance a weight distribution of the rotor assembly 400. The first component 402 may be a bladed rotor assembly and the second component 404 may be a rotor shaft or a disk coupling the first component 402 to a rotor shaft. Likewise, the first component 402 may be a rotor shaft or a disk and the second component 404 may be a bladed rotor assembly.

The first component 402 includes a first rotor body 460 that extends circumferentially about the central axis 11 and a plurality of first splines 410 that extend radially away from the first rotor body 460. In the illustrative embodiment, the plurality of first splines 410 extend radially outward from the central axis 11. The plurality of first splines 410 extend radially outward from the first rotor body 460 toward the second component 404. The plurality of first splines 410 are formed on the first component 402 circumferentially entirely about the central axis 11.

The first rotor body 460 is further formed to define a plurality of holes 466 that are spaced circumferentially about the first rotor body 460 and extend radially through the first rotor body 460. The first rotor body 460 includes any number of holes 466 spaced circumferentially about the first rotor body 460. In some embodiments, the holes 466 are equally spaced circumferentially about the first rotor body 460. In some embodiments, the plurality of holes 466 includes at least three holes 466.

The second component 404 includes a second rotor body 480 extending circumferentially about the central axis 11 and a plurality of second splines 414 extending radially away from the second rotor body 480. The plurality of second splines 414 extend radially inward from the second component 404 to interlock with the plurality of first splines 410 of the first component 402 so that torque is transferred between the second component 404 and the first component 402 during rotation of the rotor assembly 400. The second component 404 includes a disk 462 that extends radially relative to the central axis 11. The second rotor body 480 is coupled with a radially outer end 464 of the disk 462 so that the disk 462 extends radially inward from the second rotor body 480.

The balance weight assembly 406 includes a plurality of pins 470 and a retainer ring 472 as shown in FIGS. 18 and 19. Each pin 470 includes a head 476 and a body 478 extending from the head 476. In some embodiments, the plurality of pins 470 includes at least three pins. Each of the plurality of pins 470 is removeably extended radially through a corresponding one of the plurality of holes 466. In the illustrative embodiment, the body 478 of the pin 470 is extended through the hole 466. In the illustrative embodiment, every hole 466 has a corresponding pin 470 extending therethrough.

A portion 474 of each of the plurality of pins 470 is exposed by the first component 402 and the second component 404 to allow the portion 474 of each of the plurality of pins 470 to be machined as a sacrificial layer or material to balance the rotor assembly 400 without removing the plurality of pins 470 from the plurality of holes 466. The portion 474 of each of the plurality of pins 470 that is exposed by the first component 402 and the second component 404 extends radially outward of the first component 402. In the illustrative embodiment, the portion 474 of the pin 470 that is exposed is disposed on the body 478 of the pin 470. In some embodiments, at least one of the plurality of pins 470 is removeable from the corresponding hole 466 to balance the rotor assembly 400. In some embodiments, at least one of the plurality of pins 470 is removed and replaced to balance the rotor assembly 400.

The retainer ring 472 extends circumferentially about the central axis 11 radially inward of the first component 402 and engages the plurality of pins 470 to block radially inward movement of the plurality of pins 470. The retainer ring 470 is coupled with the second component 404 in the illustrative embodiment. In other embodiments, the retainer ring 472 is coupled to the first component 402 or omitted. The retainer ring 470 is coupled with the disk 462 and extends axially away from the disk 462. The plurality of second splines 414 is aligned axially with the plurality of first splines 410 and the retainer ring 472, so that the plurality of second splines 414 is located radially between the plurality of first splines 410 and the retainer ring 472. A head 476 of each of the plurality of pins 470 is radially positioned between the retainer ring 472 and the first component 402. The retainer ring 472 includes a forward portion 440 and an aft portion 442. The forward portion 440 is located radially outward of the aft portion 442. The forward portion 440 is axially located between the head 476 of each of the plurality of pins 470 and the first component 402.

In the illustrative embodiment, the balance weight assembly 406 is used to balance the weight distribution of the rotor assembly 400. The pins 470 of the balance weight assembly 406 are inserted through the corresponding holes 466 of the first component 402 to maintain the position of the balance weight assembly 406 in relation to the first component 402 and the second component 404. Additionally, the exposed portion 474 is configured to be machined while the first component 402 and the second component 404 remain interlocked via the plurality of first splines 410 and the plurality of second splines 414, such that disassembling the first component 402 and the second component 404 is not necessary. In some embodiments, the retainer ring 472 is removable without separating the components 402, 404 to allow the pins 470 to be replaced, removed, moved to different holes 466, machined, etc. In some embodiments, new pins 470 are used and machined to balance the rotor assembly 400 for every build up (assembly) of the rotor assembly 400.

A method of assembling the rotor assembly 400 of the gas turbine engine 10 may include several steps. The method includes arranging the first component 402 of the rotor assembly 400 circumferentially about the central axis 11. The first component 402 includes the plurality of first splines 410. The method further includes arranging the second component 404 of the rotor assembly 400 circumferentially about the central axis 11. The second component 404 includes the plurality of second splines 414. The method further includes interlocking the plurality of first splines 410 of the first component 402 with the plurality of second splines 414 of the second component 404. The method includes determining a balance offset of the rotor assembly 400 of the gas turbine engine 10.

The method further includes locating the balance weight assembly 406 so that each pin 470 extends through a corresponding one of the plurality of holes 466 to interlock each pin 470 with the first component 402 and prevent circumferential movement of each pin 470 in relation to the first component 402. A head 476 of each pin 470 is positioned outside of the one of the plurality of holes 466 and radially inward of the first component 402. The method further includes locating the retainer ring 472 circumferentially about the central axis 11 and at least partially radially inward of each pin 470 to prevent radial movement of each pin 470. The method further includes determining a balance offset of the rotor assembly 400 of the gas turbine engine 10 and machining the exposed portion 474 of at least one pin 470 based on the balance offset of the rotor assembly 400 without removing any pins 470 from the corresponding holes 466.

The method may also include removing a first pin 470 and separating the first component 402 and the second component 404. The method may also include recoupling the first component 402 and the second component 404 and locating a second pin 470 in the one of the plurality of holes 466. The method may also include determining a second offset of the rotor assembly 400 and machining the second pin 470 based on the second offset. The method may further include, at least one of inserting a pin 470 in the first component 402 at a different circumferential position and inserting additional pins 470 in the first component 402.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A rotor assembly adapted for use in a gas turbine engine, the rotor assembly comprising:

a first rotor arranged circumferentially about a central axis, the first rotor having a first rotor body that extends circumferentially about the central axis and a plurality of first splines that extend radially away from the first rotor body, the rotor body formed to define a plurality of holes that are spaced circumferentially about the first rotor body and extend radially through the first rotor body, a second rotor arranged circumferentially about the central axis, the second rotor having a second rotor body that extends about the central axis and a plurality of second splines that engage the plurality of first splines to couple the second rotor with the first rotor for rotation therewith, and a balance weight assembly configured to balance a weight distribution of the rotor assembly, the balance weight assembly including a plurality of pins and a retainer ring, each of the plurality of pins extending radially through a corresponding one of the plurality of holes, the retainer ring extending circumferentially about the central axis radially inward of the first rotor and engages the plurality of pins to block radially inward movement of the plurality of pins, wherein a portion of each of the plurality of pins is exposed by the first rotor and the second rotor to allow the portion of each of the plurality of pins to be machined to balance the rotor assembly without removing the plurality of pins from the plurality of holes.

2. The rotor assembly of claim 1, wherein a head of each of the plurality of pins is radially positioned between the retainer ring and the first rotor.

3. The rotor assembly of claim 1, wherein the retainer ring is coupled with the second rotor.

4. The rotor assembly of claim 1, wherein the second rotor includes a disk that extends radially relative to the central axis, the second rotor body is coupled with a radially outer end of the disk, and the retainer ring is coupled with the disk and extends axially away from the disk.

5. The rotor assembly of claim 1, wherein the plurality of first splines is aligned axially with the plurality of second splines and the retainer ring and located radially between the plurality of second splines and the retainer ring.

6. The rotor assembly of claim 1, wherein the plurality of pins includes at least 3 pins.

7. The rotor assembly of claim 1, wherein the portion of each of the plurality of pins that is exposed by the first rotor and the second rotor extends radially outward of the first rotor.

8. The rotor assembly of claim 1, wherein the retainer ring includes a forward portion and an aft portion, wherein the forward portion is located radially outward of the aft portion.

9. The rotor assembly of claim 8, wherein the forward portion is axially located between a head of each of the plurality of pins and the second rotor.

10. A rotor assembly adapted for use in a gas turbine engine, the rotor assembly comprising:

a first component arranged circumferentially about a central axis, the first component having a first body that extends circumferentially about the central axis, wherein the first body is formed to define a plurality of holes that are spaced circumferentially about the first body and extend through the first body, a second component arranged circumferentially about the central axis, the second component having a second body that extends about the central axis, and a balance weight assembly configured to balance a weight distribution of the rotor assembly, the balance weight assembly including a pin and a retainer ring, the pin extending through a corresponding one of the plurality of holes, the retainer ring extending circumferentially about the central axis and engaging the pin to block movement of the pin, wherein a portion of the pin is exposed to allow the portion of the pin to be machined to balance the rotor assembly without removing the pin from the one of the plurality of holes.

11. The rotor assembly of claim 10, wherein a head of the pin is radially positioned between the retainer ring and the first component.

12. The rotor assembly of claim 10, wherein the retainer ring is coupled with the second component.

13. The rotor assembly of claim 10, wherein the second component includes a disk that extends radially relative to the central axis, the second body is coupled with a radially outer end of the disk, and the retainer ring is coupled with the disk and extends away from the disk.

14. The rotor assembly of claim 10, wherein the first component includes a plurality of first splines that engage a plurality of second splines of the second component to couple the second component with the first component for rotation therewith, wherein the plurality of first splines is aligned with the plurality of second splines and the retainer ring and located between the plurality of second splines and the retainer ring.

15. The rotor assembly of claim 10, further comprising at least 3 pins.

16. The rotor assembly of claim 10, wherein the portion of the pin that is exposed extends radially outward of the first component.

17. The rotor assembly of claim 10, wherein the retainer ring includes a forward portion and an aft portion, wherein the forward portion is located radially outward of the aft portion, wherein the forward portion is axially located between a head of the pin and the second component.

* * * * *